Patented Sept. 30, 1924.

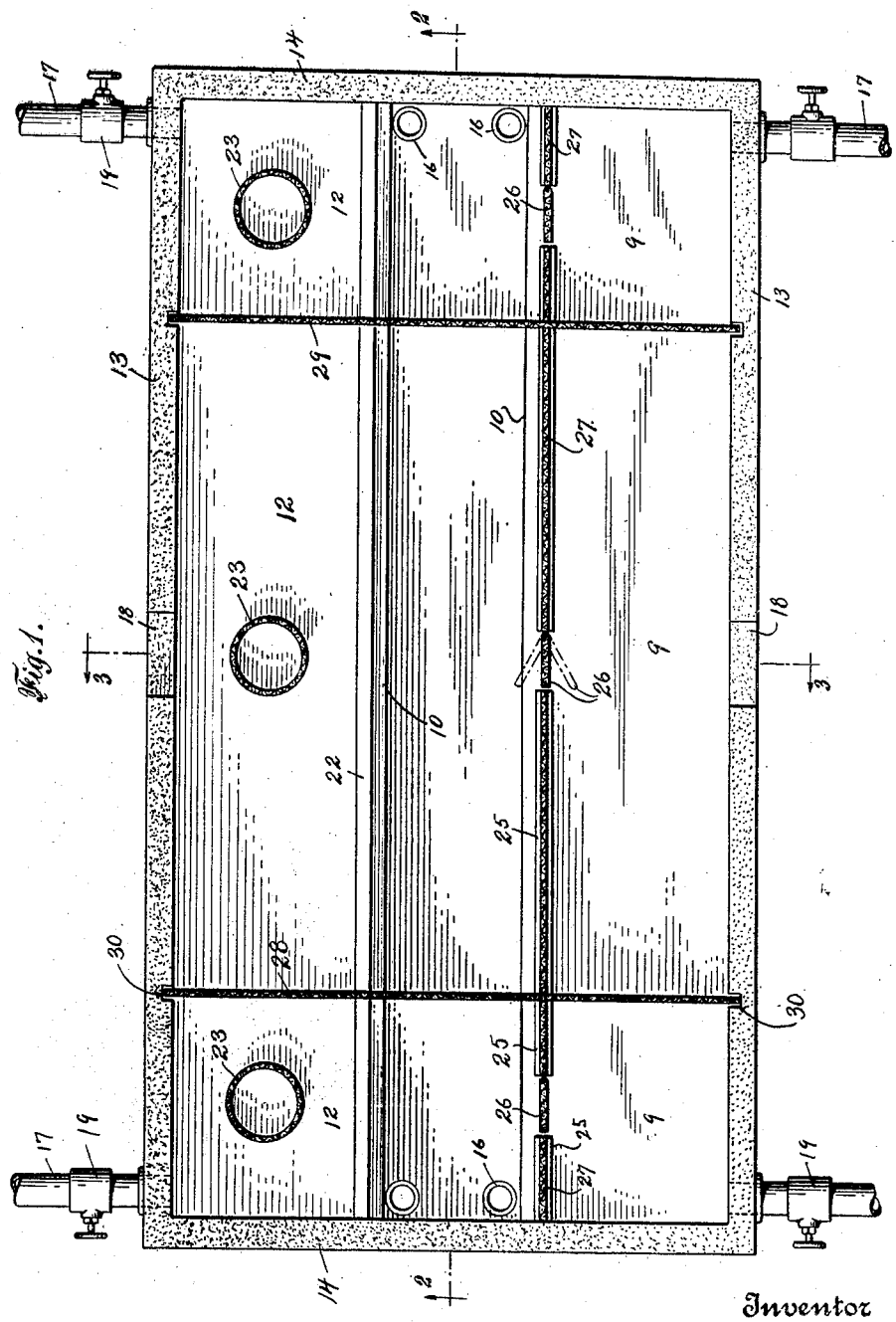

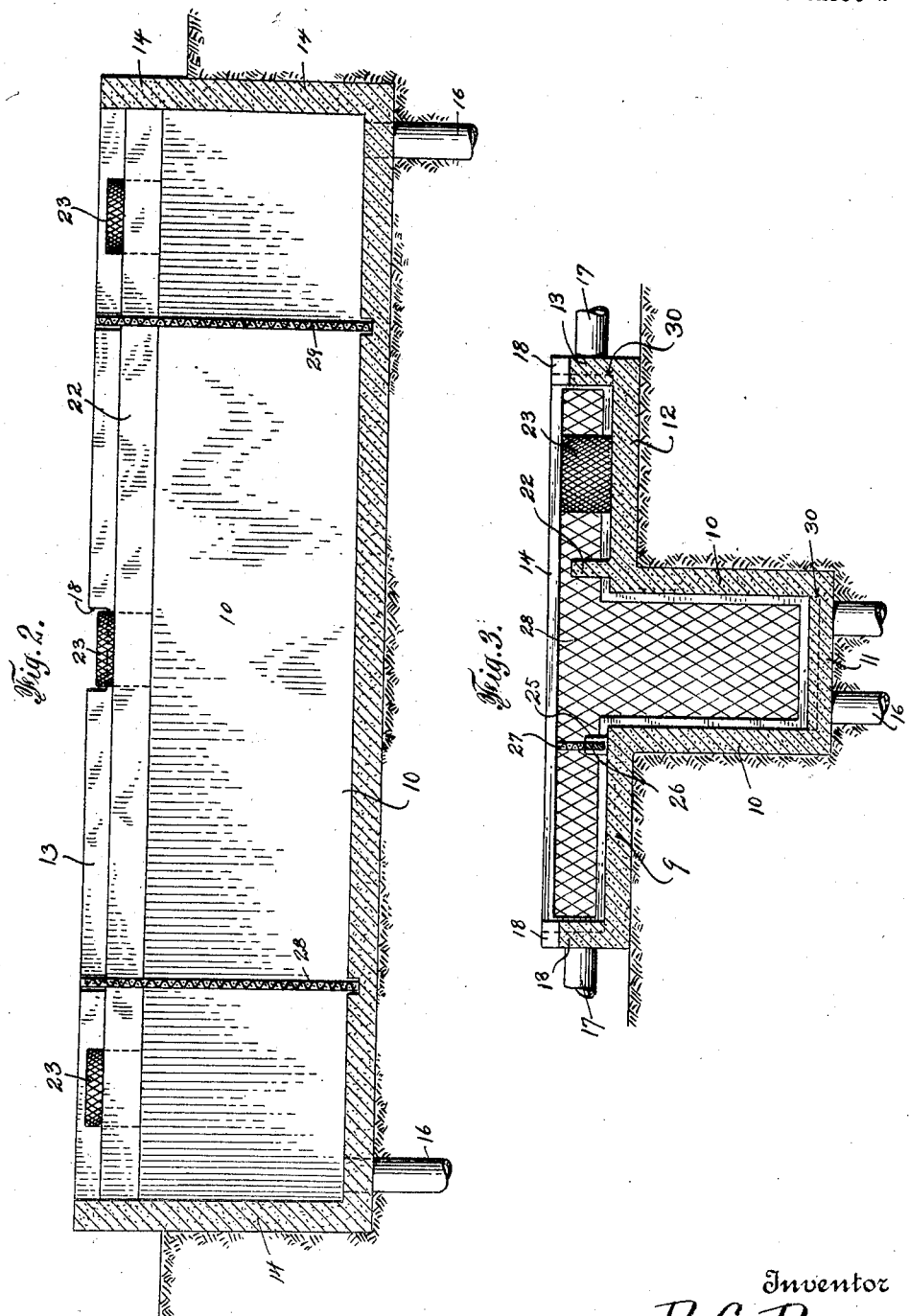

1,509,979

UNITED STATES PATENT OFFICE.

DAVID C. PRYOR, OF OKLAHOMA CITY, OKLAHOMA.

FISH NURSERY.

Application filed April 21, 1923. Serial No. 633,636.

*To all whom it may concern:*

Be it known that I, DAVID C. PRYOR, a citizen of the United States, residing at Capital Hill Station, Oklahoma City, in the county of Oklahoma and State of Oklahoma, have invented certain new and useful Improvements in a Fish Nursery, of which the following is a specification.

This invention relates to fish pools, ponds or nurseries, and more particularly to certain improvements in the structure thereof and the accessories which make up the nursery pond; and the primary object thereof is to produce such improvements as will contribute to breeding and nurturing of food fish from the earliest stages of growth throughout the life cycle thereof, until the fish have reached a growth sufficient to be used for food.

A further object of the invention is to produce improvements in a nursery and fish pond as will afford the fish all the environment of ordinary natural stream or lake accommodations and life, including both deep water and shallow water habitat so as to afford fish of all stages of life and size opportunity of growth in various depths of water thereby producing healthy food fish.

Another object is to provide adequate means for dividing or segregating the fish according to the age and size thereof, and to further provide feeding grounds for all the fish wherein the smaller and weaker fish will not be molested by the larger fish which have attained maturity in the pool environments.

With the above principal objects and others in view, the invention is illustrated in the accompanying drawing showing an embodiment thereof serving to disclose the principle, construction, and its uses, and the arrangement of parts may be variously modified without departing from the scope of my invention as set forth in the appended claims.

Figure 1 shows a plan view of the fish nursery; and Figure 2 shows a longitudinal sectional view of the fish nursery as taken on the line 2—2 of Figure 1. Figure 3 illustrates a cross sectional view taken on the line 3—3 of Figure 1.

Referring now more in particular to the drawings for a detailed description of the invention there is shown a fish pool and nursery comprising a substantially deep pool formed by parallel side walls 10 and a bottom wall 11; and the deep pool wall flanges out into shelves or wings 9 and 12 from which rises a marginal wall 13 bounding the fish pool. This construction affords a deep fish pool 10 with deep water and shallow water environment for the growth of fish during all stages of life; and at the same time provides a substantially large spread of water in the shallow pools 9 and 12. The pond is preferably of substantial length and is closed with end walls 14.

Water inlets, preferably in the form of wells 16 are established in the deep pool 10 so as to afford a continual supply of fresh water feeding into the bottom of the pool and upwardly over and across the shallow pools; and the water flows from the fish nursery through the water gaps 18 made in the marginal walls 13. The arrangement of water inlets or wells 16 with water gap 18 provides sufficient water circulation throughout the pool whereby settled waste materials are lifted upwardly through the pool and discharged therefrom, this maintains a supply of fresh water within the pool because of the upward flow through the deep pool and across the shallow pools. The overflow gap 18 in the marginal wall 13 provides a high water mark in the pool which discharges water from the pool. Waste discharge pipes 17 are disposed in the wall 13 as clean out pipes and are provided with valves 19 which are normally kept closed but which may be opened when it is desired to wash out the shallow pools.

A wall 22 is established in the shallow pool 12 thereby setting off this pool from the deep pool 10 and establishing a feeding ground 12. This wall 22 is preferably located adjacent to the edge of pool 10 and runs parallel thereto, and is of less height than the wall 13 in order that the fish may pass over the wall 22 into the feeding ground 12. Feed pens 23 are disposed in the feeding ground 12 and are made of small size wire mesh material in order that the smaller fish may enter the feeding pens 23 and remain therein without being disturbed by the larger fish. This arrangement permits the larger fish to be fed on the floor of the feeding ground 12 while at the same time the smaller fish receive food in the pens 23 thereby establishing a common feeding ground throughout the length of the pool for all the fish in various stages of growth. This arrangement enables the keeper in charge to spread food from one side of the pool only thereby making for the convenience in maintaining the fish nursery.

Another wall 25 is established on the other side on the edge of the deep pool 10 opposite the wall 22, thereby setting off a spawning ground 9. The wall 25 is provided with a plurality of water vanes or gates 26 which swing back and forth to permit the fish to pass in and out the spawning grounds; and these gates are constructed of light material which are buoyed up by the water in the pool. A wire screen 27 is superposed on the top of wall 25 and runs lengthwise of the pool to establish a barrier against the entrance of fish into the spawning ground, but which at the same time permits free circulation of water flowing upwardly through the deep pool 10, and outwardly through the gap 18.

Screen wire separators or partitions 28 and 29 are disposed transversely of the fish pool thereby dividing the nursery in compartments for the purpose of segregating fish in various stages of development. Grooves 30 are made in the walls of the fish pool which retain the screens in position. The screens may be readily removed from the pool where it is not necessary to segregate the fish into different classes. When the young fish hatch in the spawning ground they may be separated from company with the larger fish and placed in one of the compartments formed by the screen wire partitions in order that they may develop and grow together in their own particular age, class and size without hindrance by the fish of the compartment where hatched.

The floor of the spawning ground 9 is preferably made of sand and gravel while the wall structure of the pool is made of concrete suitably reinforced if necessary. It is preferably to construct the pool with the deep portion 10 thereof below the ground and flange or wings 9 and 12 placed on the ground surface so that the walls 13 rise sufficiently high above the ground to afford protection to the pool.

What I claim is:

1. A fish nursery comprising a central deep pool, shallow flanges extending outwardly from the deep pool to each side thereof, and suitable partitions dividing the flanged portions into compartments to accommodate the fish during their early life cycle.

2. A fish nursery comprising a deep central pool, water shelves flanging outwardly therefrom forming shallow pools, an enclosure wall bounding the several pools, water-inlets in the bottom of the central pool, water cleanouts in the shallow pools, and separating screens to provide fish compartments.

3. A fish nursery comprising a deep pool, flanges extending outwardly from the deep pool, partitions dividing the nursery into compartments to accommodate the fish during their several stages of growth, and a wall rising from one flange to make a feeding ground on the flange.

4. A fish nursery comprising a deep pool, flanges extending outwardly from the deep pool, partitions dividing the nursery into compartments to accommodate the fish during their several stages of growth, a wall rising from one flange to make a feeding ground on the flange, and screen wire enclosure pens within the feeding grounds in which the smaller fish only retreat for food.

5. A fish nursery comprising a deep pool, flanges extending outwardly from the deep pool, partitions dividing the nursery into compartments to accommodate the fish during their several stages of growth, a wall rising from one flange to make a feeding ground on the flange, and a wall rising from the other flange to form a spawning-ground on the flange.

6. A fish nursery comprising a deep pool, flanges extending outwardly from the deep pool, partitions dividing the nursery into compartments to accommodate the fish during their several stages of growth, a wall rising from one flange to make a feeding ground on the flange, a wall rising from the other flange to form a spawning-ground, and a wire screen surmounting the wall.

7. A fish nursery pond comprising a shallow pool subdivided into spawning and feeding grounds, a deep pool connecting with the shallow pool, and transverse separators disposed in the nursery pond subdividing it into several compartments embracing a portion of the aforesaid feeding and spawning grounds and deep pool affording varied pool environment for fish nurture.

8. A fish nursery pond comprising a shallow pool subdivided into spawning and feeding grounds, a deep pool connecting with the shallow pool, transverse separators disposed in the nursery pond subdividing it into several compartments embracing a portion of the aforesaid feeding and spawning grounds and deep pool affording varied pool environment for fish nurture, water inlets in the deep pool flowing upwardly across the shallow pool, and water outlets in the shallow pool.

9. A fish nursery pond comprising a shallow pool embracing a concrete feeding floor and a sand and gravel spawning ground, a deep fish pool extending centrally through the shallow pool, a substantially high wall disposed along the deep wall edge to set off the feeding ground from the pond, a second wall substantially lower than the first one to mark off the spawning ground, a wire screen wall surmounting the lower wall, and a gate interposed in the last wall and screen wire.

10. A fish nursery pond comprising a shallow pool embracing a concrete feeding floor and a sand and gravel spawning ground, a deep fish pool extending centrally through the shallow pool, a substantially high wall disposed along the deep wall edge to set off the feeding ground from the pond, a second wall substantially lower than the first one to mark off the spawning ground, a wire screen surmounting the lower wall, a gate interposed in the last wall and screen wire, and transverse screen separators subdividing the pool into a plurality of compartments embracing a portion of each of the pools.

11. A fish pond comprising a shallow pool, clean-out discharge pipes provided in the wall, parallel walls arranged to divide the pond into spawning and feeding grounds, a deep pool reaching down between the parallel walls, said walls made with guide grooves therein, and screen separators placed in the grooves.

12. A fish pond nursery embodying a shallow pool and connecting deep pool, a series of screen partitions embracing spawning and feeding grounds in the shallow pool, and a deep water reserve affording complete segregated nursery units in which fish may be nurtured during their entire life cycle.

13. A fish pond nursery embodying a shallow pool and connecting deep pool, a series of screen partitions embracing spawning and feeding grounds in the shallow pool, a deep water reserve affording complete segregated nursery units in which fish may be nurtured during their entire life cycle, and a feed pen in each unit for the protection of the smaller fish.

14. A fish nursery consisting of a walled inclosure made with a series of vertical grooves, screen wire partitions removably supported in the grooves, in combination with water shelves spreading outwardly from the walled inclosure, a wall extending along one of the shelves, gates made in the wall, and water well inlets at the bottom of the inclosure.

15. A fish nursery consisting of an inclosure made with a series of vertical grooves, screen wire partitions removably supported in the grooves, a screen partition extending transversely to the first named screen, screen wire gates made in the last named screen wire partition, water inlets and outlets, a shallow water reserve at one side of the gates, and a deep water pool at the other side of the gates.

In testimony whereof I affix my signature.

D. C. PRYOR.